United States Patent [19]

Piguet et al.

[11] 4,369,440

[45] Jan. 18, 1983

[54] DATA INPUT DEVICE

[75] Inventors: Christian Piguet, Neuchâtel; Jean-Felix Perotto, Hauterive, both of Switzerland

[73] Assignee: Centre Electronique Horloger, S.A., Neuchatel, Switzerland

[21] Appl. No.: 242,171

[22] Filed: Mar. 10, 1981

[30] Foreign Application Priority Data

Mar. 14, 1980 [CH] Switzerland ........................ 2007/80

[51] Int. Cl.$^{3}$ ................................................ G06F 3/14

[52] U.S. Cl. .................................... 340/711; 340/718; 340/365 R; 178/18

[58] Field of Search ........... 340/711, 712, 718, 365 R, 340/365 A, 365 C, 365 L, 365 P; 178/18

[56] References Cited

U.S. PATENT DOCUMENTS

| | | | |
|---|---|---|---|
| 4,065,754 | 12/1977 | Miura et al. | 340/711 |
| 4,107,915 | 8/1978 | Sekiya et al. . | |
| 4,196,580 | 4/1980 | Scherrer . | |
| 4,242,676 | 12/1980 | Piguet et al. | 340/711 |

FOREIGN PATENT DOCUMENTS

| | | |
|---|---|---|
| 2855935 | 7/1979 | Fed. Rep. of Germany . |
| 2400227 | 9/1979 | France . |
| 1429601 | 3/1976 | United Kingdom . |
| 1496653 | 12/1977 | United Kingdom . |
| 1498768 | 1/1978 | United Kingdom . |
| 1526468 | 9/1978 | United Kingdom . |
| 2011129 | 7/1979 | United Kingdom . |
| 2019049 | 10/1979 | United Kingdom . |
| 2019052 | 10/1979 | United Kingdom . |

*Primary Examiner*—Alvin H. Waring

*Attorney, Agent, or Firm*—Stevens, Davis, Miller & Mosher

[57] ABSTRACT

A device is provided for the rapid and easy introduction of data into an apparatus, e.g., for setting a digital watch. A binary decision device continuously tests the state of a plurality of finger responsive sensors A, B, C and D and produces control signals for a operational unit. The operational unit comprises an up-down counter which can be incremented or decremented by signal F1 to F8 at different frequencies. An inertia effect is produced by maintaining counting of the up-down counter between two successive actuations of the sensors. Touching sensor B or C stops the counter. Sweeping A, B, C, D speeds the incrementing rate (up to a top rate) or slows the decrementing rate while sweeping D, C, B, A acts conversely. Touching A and D alone, respectively, single-steps the counter down and up. The amount by which the rate is speeded or slowed can be made to depend on the speed of sweeping the sensors as well as the number of times they are swept. Other embodiments use three buttons A (speed up), B (slow down) and C (stop). Pushing A+C single-steps the counter up while pushing B+C single-steps the counter down. The amount by which the rate is speeded or slowed can depend on the number of operations of A or B or also on the length of time A or B is held depressed.

17 Claims, 10 Drawing Figures

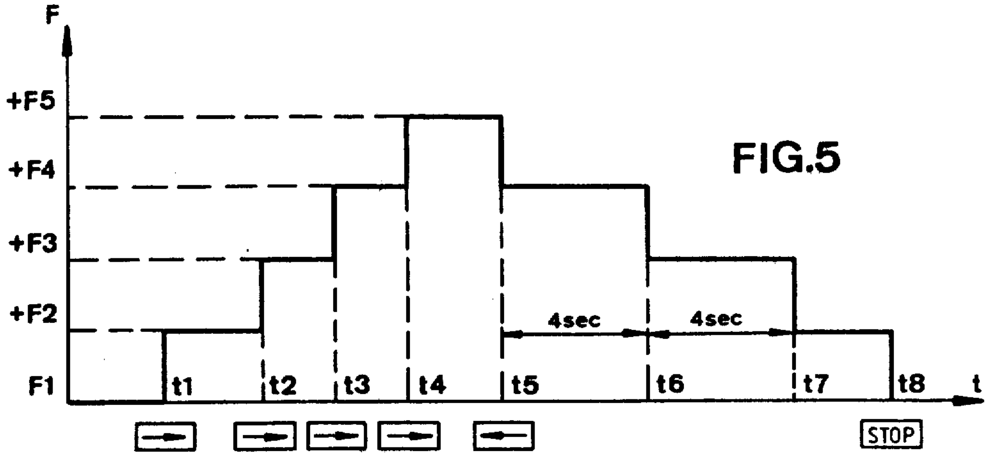
FIG.5
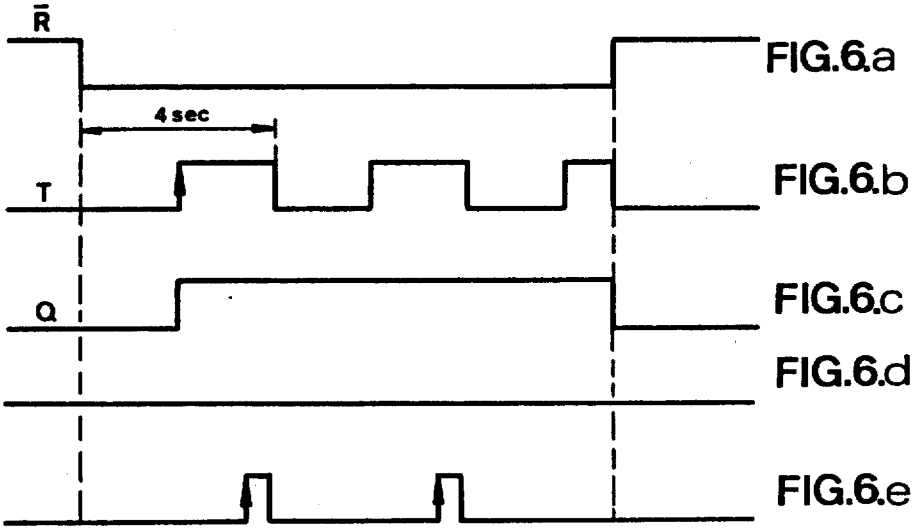
FIG.6.a
FIG.6.b
FIG.6.c
FIG.6.d
FIG.6.e

DATA INPUT DEVICE

BACKGROUND OF THE INVENTION

The present invention concerns data input devices and relates more particularly to an entirely electronic device which makes use of the principle of progression of data in response to movement of a finger over responsive sensors.

The principle of progressively moving a group of data across a display and stopping the progression when the piece of data displayed corresponds to that desired, has been widely used for the purposes of data entry. For example, when setting the correct time on a digital display of watch, time data is progressively displayed until the proper time is reached.

A device which makes it possible to cause data to move across a display by acting on a push button is known for example from the present applicants' Swiss Pat. No. 533,332. Such a device is found too inconvenient when there is a large number of data as the speed of progression must necessarily be slow in order to permit visual monitoring of the data. The present applicants' U.S. Pat. No. 4,242,676 discloses other data input devices in which data progression, the speed of which depends on the speed of movement, is produced in response to movement of a finger of an operator over sensors. In the latter devices, the direction of progression of the data depends on the order in which the sensors are activated and the speed of progression is variable, but the number of symbols is limited. British patent applications Nos. 2,019,049A and 2,019,052A describe electronic devices for correcting displayed information on a watch, wherein the correction operation is controlled by rotation of the setting crown of the watch. In the first application, the direction of rotation of the setting crown determines the correction function (correction in respect of the time or correction in respect of date) and the correction pulses which are delivered by the described device are at a first or second frequency, depending on the speed of rotation of the crown. In the second application, the same correction control principle is used but on the one hand the direction of rotation of the crown determines the direction in which the correction is made and on the other hand the device can produce more than two correction pulse frequencies, depending on the speed of rotation of the crown. The latter devices suffer from the disadvantage of employing a mechanical and therefore generally unreliable control member. Moreover, the provision of only two speeds of correction is found to be inconvenient.

SUMMARY OF THE INVENTION

An object of the present invention is to provide an entirely electronic data input device which does not suffer from the above-indicated disadvantages and which has a greater degree of flexibility of use.

This object is achieved in the device according to the invention which is defined in the claims below. The speed progression can depend either on the number of times that the sensors are actuated, or the period of time for which the sensors are actuated, or the time taken for actuating a plurality of sensors in sequence. Provision is made for ensuring progression of data between two successive actuations of the sensors. Provision may also be made for single stepping the progression in either direction.

In accordance with an optional feature of the invention, the device also includes means for reducing the speed of progression when no sensor has been actuated for a given period of time.

The device according to the invention, as defined by virtue of the above-indicated features, is very easy to use, permitting: rapid progression of the data, in one direction or the other, for the purposes of coarse adjustment; a reduction in the speed of progression when approaching the piece of data required; and, stepwise progression for the purposes of making a fine adjustment. Moreover, the inertia effect caused by the speed of progression acquired by successive activations of the sensors is maintained or decreases progressively as soon as the sensors cease to be activated, giving rise to a similarity between the device and moving parts (such as friction-type mechanisms). Finally, the device can be of an entirely electronic construction, thereby giving it a high degree of reliability.

BRIEF DESCRIPTION OF THE DRAWINGS

The invention will be described in more detail by way of example with reference to the accompanying drawings in which:

FIG. 5 is a diagram illustrating the mode of operation of the embodiment shown in FIG. 4, and FIGS. *6a* to *6e* show different signals which occur in the FIG. 4 embodiment.

DETAILED DESCRIPTION OF THE INVENTION

Figure 1:
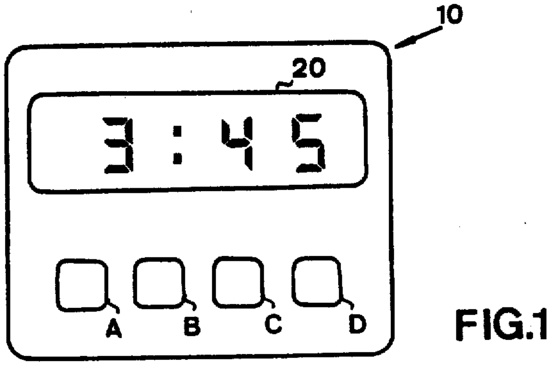
FIG. 1 shows an apparatus provided with a digital display and sensors for introducing data to which the principles of the present invention can be applied.

FIG. 1 shows an apparatus 10 provided with a numerical display 20 and four sensors A, B, C and D. By way of example, the apparatus 10 may be a watch, in which case the device according to the invention will serve for setting the watch time. Generally, however, the invention may be applied to any apparatus which requires a data input. The sensors A, B, C and D will preferably be of capacitive type although other types of sensors which involve various physical parameters (light, temperature, pressure, etc.), can also be used, as will be seen hereinafter.

Figure 2:
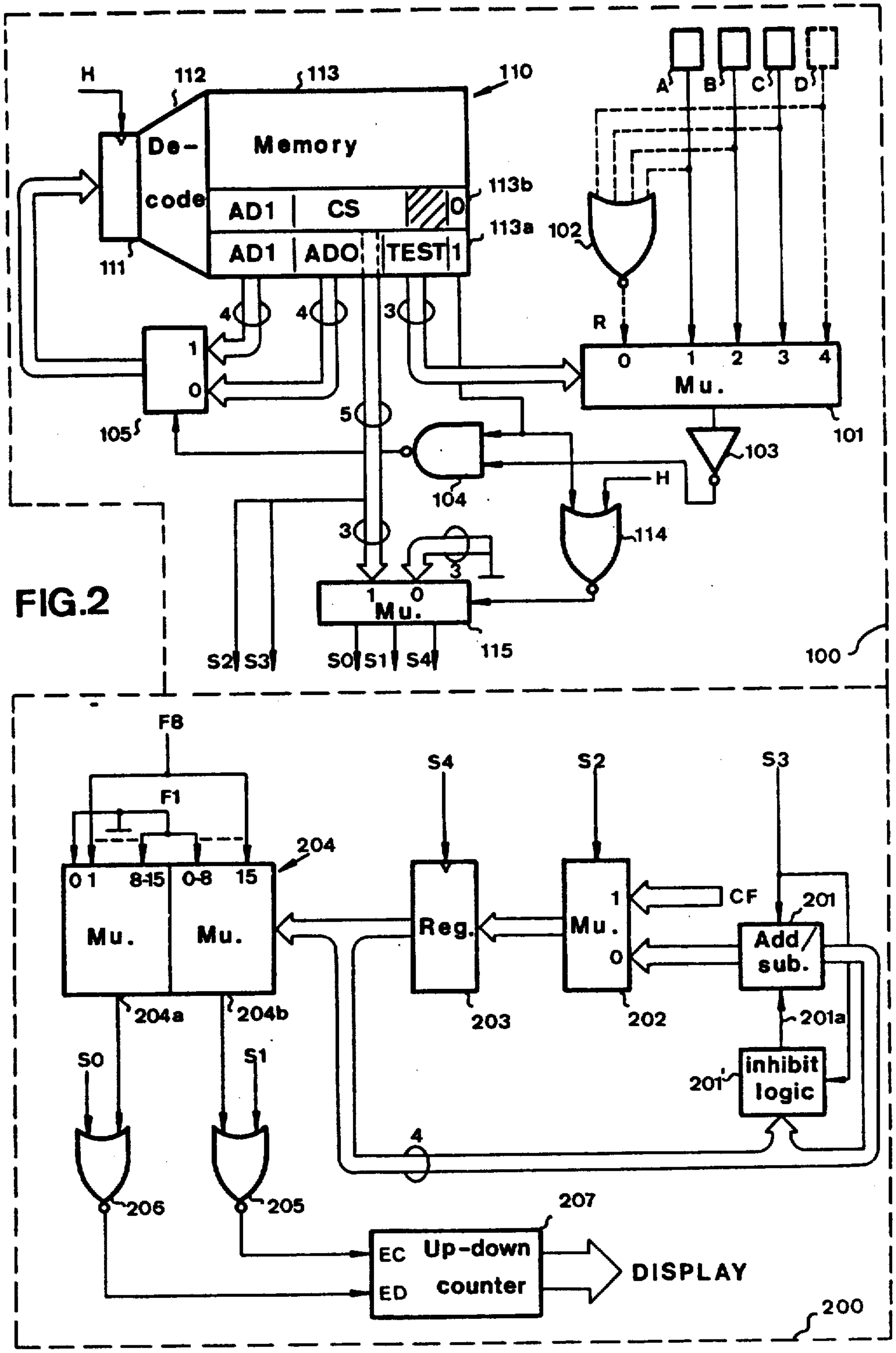
FIG. 2 shows a first embodiment of a data input device according to the invention.

The diagrammatic view shown in FIG. 2 illustrates a first embodiment of a data input device which is in accordance with the principles of the present invention. The output signals of the sensors A, B, C and D are applied to the input of a five-input selection circuit or multiplexer 101 and to a NOR-gate 102, the output of which is also connected to an input of the multiplexer 101. The output of the multiplexer 101 is applied by way of an inverter 103 to an input of a NAND-gate 104, the output of which is applied to the selection input of a multiplexer 105. The multiplexer 105 comprises two inputs, with four bits each. The four output bits of the multiplexer 105 are applied by way of an address register 111 and a decoder 12 to a memory 113 of a memory unit 110 having a capacity of sixteen words of twelve bits. The words contained in the memory 13 constitute instruction words. Two types of instruction are provided, namely: a test instruction 113*a* and an output instruction 113*b*.

The test instruction comprises a first address field with four bits, designated AD1, a second address field with four bits, designated AD0, a test field with three bits, designated TEST, and an operating code of value 1. The output instruction comprises an address field with four bits, designated AD1, an output code with five bits, designated CS, and an operating code of value 0.

The addresses AD0 and AD1 are each applied to an input of the multiplexer 105, the test code is applied to the selection input of the multiplexer 101 and the operating code is applied on the one hand to the second input of the gate 104 and on the other hand to an input of a NOR-gate 114 which receives a clock signal H at its other input. The output of the gate 114 is connected to the selection input of a multiplexer 115. The multiplexer 115 comprises two inputs with three bits, one of which is connected to ground (logic value 0) while the other is connected to three of the five bits of the output code CS. The three output signals of the multiplexer 115 constitute control signals designated S0, S1 and S4 and the last two bits of the output code CS constitute two control signals designated S2 and S3.

The multiplexers 101, 105 and 115, the gates 102, 104 and 114 and the memory unit 110 form a control unit 100, the output signals S0 to S4 of which serve to control the operational unit 200. The unit 200 comprises an adder-subtractor 201 which is associated with a logic circuit 201', a multiplexer 202, a register 203, a double multiplexer 204, two NOR-gates 205 and 206, and an up-down counter 207. The circuit 201 receives four bits representing the contents of the register 203, and increments or decrements the corresponding value by one unit, depending on the logic value of the signal S3 (incrementation being effected when S3 is at state 0). The circuit 201 has an inhibition input to which the output 201*a* of the logic circuit 201' is connected. The function of the logic circuit is to detect the value fifteen of the content of the register 203 when S3 is at state 0 or the value one of said content when S3 is at state 1. The output of the circuit 203 forms an input of the multiplexer 202, the other input of which receives a fixed code CF. Under the control of the signal S2, one or other of the two codes applied to the input of the multiplexer 202 is applied to the input of the register 203 which is loaded by the signal S4. The content of the register 203 serves to select one of the signals F1 to F8 which is transmitted to the output of each multiplexer 204*a* or 204*b*. The multiplexers each comprise sixteen inputs designated 0 to 15; the inputs 1 to 7 of the multiplexer 204*a* receive the signals F8 to F2 respectively while the inputs 9 to 15 of the multiplexer 204*b* receive the signals F2 to F8 respectively, and the inputs 0 and 8 to 15 of the multiplexer 204*a* or the inputs 0 to 8 of the multiplexer 204*b* receive the signal F1. The four bits of the register 203 define sixteen different values. Seven thereof select transmission by way of the multiplexer 204*a* of the signals F2 to F8, seven others select transmission of the same signals by the multiplexer 204*b* and a value corresponding to the code CF selects the input 8 of the multiplexers 204*a* and 204*b*, which receives the signal F1. The selected signals are applied to the up-counting and down-counting inputs EC and ED respectively of the up-down counter 207, under the control of the signals S0 and S1 and by way of the NOR-gates 205 and 206.

The mode of operation of the embodiment shown in FIG. 2 is described hereinafter with reference to accompanying Table 1 and FIG. 3. As will be seen hereinafter, the control unit 100 provides for detection of the activated sensors and the order in which the sensors are activated; in consequence of the detection operation, the control unit produces the control signals S0 to S4 which determine the mode of function of the operational unit 200. In the unit 200, the register 203 controls switching to the output of the multiplexer 204*a* and the multiplexer 204*b*, of one of the signals F1 to F8 which are applied to their inputs. The signal F1 is a continuous signal while the signals F2 to F8 are at different frequencies, ranging for example from 4 Hz to 28 Hz. It will be readily appreciated then that, depending on the content of the counter 203 and the state of the signals S0 and S1, the up-down counter 207 is either stopped or caused to operate in an up-counting mode or in a down-counting mode, at a more or less rapid speed. The register 203 is loaded under the control of the signal S4 by the output code of the multiplexer 202. This output code is either the output code of the adder-subtractor 201 or the fixed code CF which, in the embodiment under consideration, corresponds to the code of the input 8 of the multiplexers 204*a* and 204*b*, which receives the continuous signal F1. The multiplexer 202 is controlled by the signal S2. When the circuit 201 is not inhibited, it increments or decrements the content of the register 203 by one unit, depending on the state of the signal S3. The signals S2, S3 and S4 therefore make it possible to load the register 203 to a fixed value or to increment or decrement the content thereof by steps of one unit and consequently to modify the mode of operation of the up-down counter 207, as has been seen hereinbefore. Inhibition of the circuit 201 occurs when either the content of the register 203 is at a value of fifteen and S3 is at state 0 (corresponding to incrementation), or the content of the register 203 is of a value of one and S3 is at state 1 (corresponding to decrementation). These two logic conditions are detected by the circuit 201'. When the circuit 201 is inhibited, the output code is equal to the input code.

The control signals S0 to S4 are produced by the control unit 100 from the output signals of the sensors A, B, C and D. The control unit is essentially a binary decision unit performing the different instructions set out in Table 1. As has been seen hereinbefore, these instructions are of two types, namely: test instructions such as those arranged at addresses 0, 1, 2, 3, 5, 6, 9, 10 and 13 (Table 1) of memory 113, and output instructions such as those addresses 4, 7, 8, 11 and 12 of the memory 113.

TABLE 1

| Addresses | Instructions |
|---|---|
| 0 | Jump to address 9 if A=1, to address 1 if A=0 |
| 1 | Jump to address 5 if D=1, to address 2 if D=0 |
| 2 | Jump to address 4 if B=1, to address 3 if B=0 |
| 3 | Jump to address 4 if C=1, to address 0 if C=0 |
| 4 | Make S4-S0 = 10100 and jump to address 0 |
| 5 | Jump to address 8 if A=1, to address 6 if A=0 |
| 6 | Jump to address 7 if R=1, to address 5 if R=0 |
| 7 | Make S4-S0 = 10110 and jump to address 0 |
| 8 | Make S4-S0 = 11000 and jump to address 13 |
| 9 | Jump to address 12 if D=1, to address 10 if D=0 |
| 10 | Jump to address 11 if R=1, to address 9 if R=0 |
| 11 | Make S4-S0 = 10101 and jump to address 0 |
| 12 | Make S4-S0 = 10000 and jump to address 13 |

TABLE 1-continued

| Addresses | Instructions |
|---|---|
| 13 | Jump to address 0 if R=1, to address 13 if R=0 |

When the first address, that is the address 0 is selected, the three bits of the test field (designated TEST in word 113*a* in FIG. 2), which are applied to the selection input of the multiplexer 101, select the output variable of the sensor A and the operating code applied to the input of the gate 104 permits that output variable to be transferred to the selection input of the multiplexer 105. If the output variable of sensor A is at state 1 (which corresponds to the activated state of the sensor A), the multiplexer 105 applies to the address register 111, the address which is contained in the address field AD1 and which, for the instruction under consideration, corresponds to the address 9 (Table 1). If the output variable of the sensor A is at state 0 (corresponding to the non-activated state of the sensor), the multiplexer 105 applies to the address register 111 the address which is contained in the address field AD0 and which, for the instruction under consideration, corresponds to the address 1. All the test instructions operate in the same manner, and only the jump addresses (AD0 and AD1) and the variable tested are different. The jump addresses and the variable tested are set forth in Table 1. The variable R is at state 1 when none of the sensors A to D is activated. For all the test instructions, the operating code (which is located at the extreme right-hand position in the word 113*a*) is at state 1, which implies that the selection input of the multiplexer 115 is at state 0. With the three signals applied to the input which is selected in this manner being at state 0, the signals S0, S1 and S4 are themselves at state 0.

The instruction stored at address 4 is an output instruction. The five bits forming the output code CS are transmitted to the operational unit 200 either directly (these being the signals S2 and S3) or by way of the multiplexer 115 (these are the signals S0, S1 and S4). The input 1 of the multiplexer 115 is in fact selected by the operating code synchronously with the clock signal H. The operating code (which is disposed at the extreme right in the word 113*b*) also has the effect of selecting the input 1 of the multiplexer 105 and consequently permitting the address AD1 to be transferred to the register 111. The instruction stored at address 4 is selected when the sensor B or the sensor C is actuated, to the exclusion of the other two sensors A and D. In that case, the signals S4 to S0 are set at states 1, 0, 1, 0 and 0 respectively, the effect of which is to load the code CF in to the register 203. The instruction at address 7 is selected when the sensor D has been actuated and then released (conditions D=1 and then R=1). In that case, the signals S4 to S0 are set at states 1, 0, 1, 1 and 0 respectively, causing the code CF to be loaded in to the register 203 and the up-down counter 207 to be incremented by one unit. In fact, the code CF corresponds to selection of the continuous signal F1 and if that signal is at state 0, the output of the gate 206 will be constantly at state 1 (S0 and F1 at 0), while the output of the gate 205 goes to state 0 when S1 goes to state 1, that is to say, synchronously with the clock signal H. The instruction stored at address 8 is selected when the sensors D and then A are actuated. In that case, the signals S4 to S0 are set at state 1, 1, 0, 0, and 0 respectively, resulting in decrementing of the register 203. If the previous content of the register 203 coresponded to selection of one of the inputs 9 to 15, decrementation of the register 203 causes slower counting of the circuit 207. On the other hand, if the previous content of the register 203 corresponded to selection of one of the inputs 1 to 8 of the multiplexers 204, decrementing of the register 203 causes more rapid down-counting of the circuit 207. The instruction stored at address 11 is selected when the sensor A has been actuated and then released. The signals S4 to S0 are then set at states 1, 0, 1, 0 and 1 respectively, which causes the code CF to be loaded into the register and a pulse to be dispatched on the down-counting input ED, in a similar manner to the situation in respect of the instruction at address 7. The instruction stored at address 12 is selected when the sensors A and D have been actuated and then released. The signals S4 to S0 are then set at states 1, 0, 0, 0 and 0 respectively, which causes incrementing of the register 203 and either slower down-counting of the up-down counter 207 if the previously selected input of the multiplexers 204 was lower than 8, or more rapid up-counting if the previously selected input of the multiplexers 204 was equal to or higher than 8.

Figure 3:
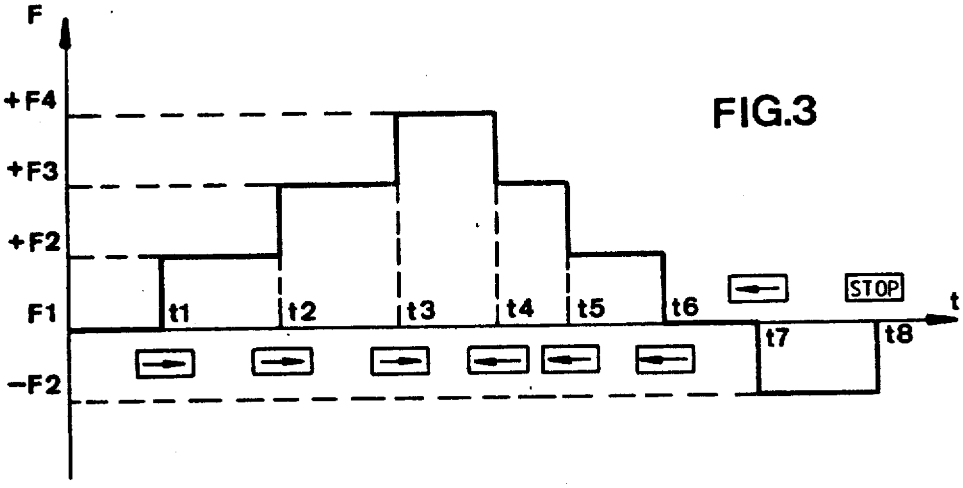
FIG. 3 is a diagram illustrating the mode of operation of the embodiment shown in FIG. 2.

The diagram shown in FIG. 3 illustrates the effect which is produced on a display such as that of a watch provided with the device illustrated in FIG. 2, by a succession of actuations of the sensors A to D. The arrows entered opposite the abscissae t1, t2, . . . t7 indicate a finger passing over the sensors A to D (instants t1, t2 and t3) or the sensors D to A (instants t4, t5, t6 and t7). The designation STOP which is entered opposite the abscissa t8 indicates action on one of the sensors B and C. The signals selected by the register 203 are entered in the ordinates. These signals are accompanied by a sign "+" when they are transmitted to the up-counting input of the up-down counter 207 and a sign "−" when they are transmitted to the down-counting input of the same up-down counter 207. The effect of a finger being passed three times in succession over the sensors A to D (instants t1, t2 and t3) is to change the counting frequency from F1 to F4, the effect of the finger being passed three times in succession over the sensors D to A (instants t4, t5 and t6) is to return the above-indicated counting fequency to zero, the following movement of a finger over the sensors D to A (instant t7) results in down-counting at the frequency F2, and action on one of the sensors B and C stops down-counting by application of the signal F1 (frequency zero) to each of the up-counting and down-counting inputs of the up-down counter 207. In the use of the device shown in FIG. 2, for correcting the information displayed by a watch, the up-down counter 207 may comprise a plurality of cascade-mode up-down counters. By way of example, two up-down counters operating on a basis of twelve and sixty respectively are required for displaying hours and minutes, as illustrated in FIG. 1.

Figure 4:
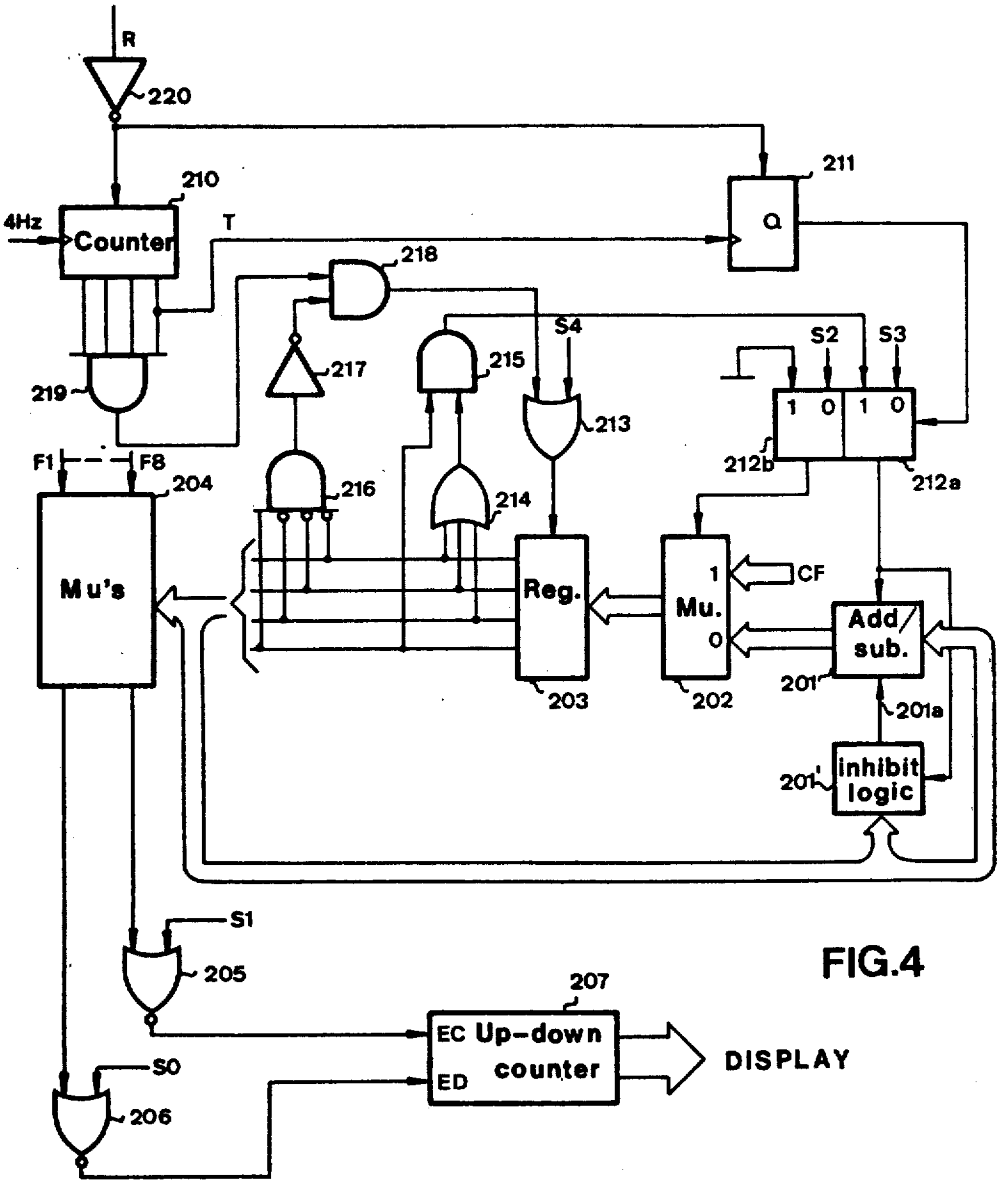
FIG. 4 shows a second embodiment of a data input device according to the invention.

FIG. 4 shows an alternative form of the operational unit which, in accordance with an advantageous feature of the invention, incorporates an inertial function. The elements which are identical to those appearing in FIG. 2 are denoted by the same references and the control unit is that shown in FIG. 2 and produces signals R and S0 to S4. An inverter 220 which receives the signal R causes zero setting of a counter 210 which counts in sixteens and a D-type flip-flop 211 when the condition R=0 is attained, that is to say, when an electrode is activated. A soon as the electrode is no longer activated, the counter 210 counts under the control of a 4

Hz signal. Two seconds after counting has begun, the last stage of the counter 210 passes to state 1 (signal T), thereby positioning the output Q of the flip-flop 211 at state 1. The multiplexers 212a and 212b which receive the output state of the flip-flop 211 on their selection input respectively switch the output state of a gate 215 and the state 0 in place of the signals S3 and S2, on the control inputs of the circuits 201 and 202. The output state of the AND-gate 215 depends on the content of the register 203. The most significant bit of the content of the register 203 is connected directly to an input of the AND-gate 215 and the three less significant bits are applied to an OR-gate 214, the output of which is connected to the second input of the gate 215. Thus, the output of gate 215 is state 1 when the most significant bit is at 1 and at least one of the three other bits is at state 1. This corresponds to a code higher than eight. Now, it has been seen hereinbefore that this corresponded to dispatch of one of the signals F2 to F8 on the up-counting input of the up-down counter 207. When the output of the gate 215 is at state 1, the circuit 201 operates in a subtracting mode and applies to the register 203, by way of the multiplexer 202, the code which is immediately below the previous content of said register. The register 203 is loaded under the control either of the signal S4 or the output signal of the AND-gate 218. The gate 218 transmits the output pulse of the AND-gate 219, which occurs when all the stages of the counter 210 are at state 1, that is to say, after four seconds, provided that the code contained in the register 203 is different from the fixed code CF. Thus, every four seconds, in the absence of a signal S4, the counter 210 causes decrementing of the content of the register 203 if the content of that register is higher than CF or incrementing of the register content if it is lower than CF. When the register content is equal to the code CF, the output pulse of the gate 219 is blocked by the gate 218.

The mode of operation of the embodiment shown in FIG. 4 is illustrated by the diagram in FIG. 5. The four successive movements (instants t1 to t4) of the finger over the sensors in the direction from A towards D have the effect of applying the signals F2, F3, F4 and then F5 to the up-counting input EC of the up-down counter 207. Movement of a finger over the sensors in the direction D towards A (instant t5) decrements the content of the register 205, resulting in selection of the signal F4. The period of time between the instants t5 and t6 on the one hand, and t6 and t7 on the other hand, is equal to four seconds. Therefore, at instants t6 and t7, there occurs automatic decrementation of the register 203 and consequently a reduction in the speed of progression of the display device which is connected to the up-down counter 207. This automatic decrementation produces an "inertia effect" which adds to operator convenience and comfort.

FIGS. 6a to 6e show some of the signals which occur in operation of the embodiment shown in FIG. 4. FIG. 6a shows the signal R, the state 0 of which authorizes the "inertia effect". FIG. 6b shows the output signal T of the last stage of the counter 210; the period of that signal is four seconds, but it is in state 1, two second after the change of state of the signal R. FIG. 6c represents the output signal Q of the flip-flop 211, which is set to state 1 by the signal T and reset to O by the signal R. FIG. 6d shows the output signal, which is assumed to be at state 0 of the gate 216. FIG. 6e shows the output state of the gate 213, that is to say, the state of the register 203 loading signal. This loading signal goes to state 1 when all the outputs of the counter 210 are at state 1, that is to say, four seconds after the change in state of the signal R.

In the above-described devices, the speed of progression of the symbols across the display depends on the number of times that the finger is passed over a group of responsive or sensitive members (sensors) of capacitive type, in one direction or the other. However, the principles of the present invention are also applicable in association with other control means and/or other selection criteria in respect of the speed and direction of selection. Among other control means which can be used, mention may be made by way of example of push buttons, at least three of which are then required to define the functions of progression in one direction, progression in the other direction, and stopping the progression, the speed of progression depending on the number of actuations of the push buttons, as in the case of the above-described devices. Among other criteria which can be employed in respect of selection of the speed of progression, mention may be made by way of example of the speed at which the finger is passed over the responsive members such as capacitive sensors, or the period of time for which a control member such as a push button is activated.

We shall therefore now describe firstly the mode of operation of a device using push buttons as control members, secondly the mode of operation of a device which uses the period of actuation of push buttons for selecting the speed of progression and thirdly the mode of operation of a device which uses the speed at which a finger is passed over electrodes, for also selecting the speed of progression.

When using push buttons as control members, the control unit and the operational unit shown in FIGS. 2 and 4 are identical, except that the sensors A, B, C and D are replaced by three push buttons A, B and C which apply either a logic state 1 to the inputs 1, 2 and 3 of the multiplexer 101, when they are activated, or a logic state 0, when they are not. In the example under consideration, the push button C serves mainly to stop progression, the push button A serves to increment the up-down counter 207 and the push button B serves to decrement the up-down counter 207. The NOR-gate 102 serves no purpose and can be omitted. The instruction words contained in the memory 113 are of the same format as before but are somewhat different, as can be seen from Table 2 below.

TABLE 2

| Addresses | Instructions |
|---|---|
| 0 | Jump to address 7 if C = 1, to address 1 if C = 0 |
| 1 | Jump to address 5 if A = 1, to address 2 if A = 0 |
| 2 | Jump to address 3 if B = 1, to address 0 if B = 0 |
| 3 | Make S4-S0 = 11000 and jump to address 4 |
| 4 | Jump to address 4 if B = 1, to address 0 if B = 0 |
| 5 | Make S4-S0 = 10000 and jump to address 6 |
| 6 | Jump to address 6 if A = 1, to address 0 if A = 0 |
| 7 | Make S4-S0 = 10100 and jump to address 8 |
| 8 | Jump to address 11 if A = 1, to address 9 if A = 0 |
| 9 | Jump to address 10 if B = 1, to address 0 if B = 0 |
| 10 | Make S4-S0 = 10101 and jump to address 4 |
| 11 | Make S4-S0 = 10110 and jump to address 6 |

The mode of operation of the device incorporating the instructions of above-indicated Table 2 is then as follows. If the push button A is pressed while the push button C is depressed, which corresponds to performance of the instructions at addresses 0, 7, 8 and 11, the fixed code CF is loaded into the register 203 and the up-down counter 207 is incremented by one unit. A jump to the address 0 is then effected as soon as the button A ceases to be pressed. If the push button B is pressed while the push button C is depressed, which corresponds to performance of the instructions at addresses 0, 7, 8, 9 and 10, the fixed code CF is again loaded into the register 203 but this time the up-down counter 207 is decremented by one unit. A jump to the address is then effected as soon as the button ceases to be depressed. Each action on the button A alone has the effect of incrementing the content of the register 203 and consequently increasing the frequency of the pulses applied to the up-counting input EC of the circuit 207 (this corresponds to performance of the instructions at addresses 0, 1, 5, and 6), and the effect of each activation of the button B alone is to decrement the content of the register 203 and consequently increase the frequency of the pulses applied to the down-counting input ED of the circuit 207 (which corresponsds to performance of the instructions at addresses 0, 1, 2, 3 and 4). In each case, a jump to the address 0 is effected as soon as the corresponding button ceases to be depressed.

It is also possible to use the time of activation of the push buttons A, B and C, for speed selection. Table 3 sets out the instructions which permit the device described with reference to FIG. 2 or with reference to FIG. 4 to operate on the basis of that criterion.

TABLE 3

| Addresses | Instructions |
|---|---|
| 0 | Jump to address 7 if C=1, to address 1 if C=0 |
| 1 | Jump to address 5 if A=1, to address 2 if A=0 |
| 2 | Jump to address 3 if B=1, to address 0 if B=0 |
| 3 | Make S4-S0 = 11000 and jump to address 4 |
| 4 | Jump to address 3 if B=1, to address 0 if B=0 |
| 5 | Make S4-S0 = 10000 and jump to address 6 |
| 6 | Jump to address 5 if A=1, to address 0 if A=0 |
| 7 | Make S4-S0 = 10100 and jump to address 8 |
| 8 | Jump to address 12 if A=1, to address 9 if A=0 |
| 9 | Jump to address 10 if B=1, to address 0 if B=0 |
| 10 | Make S4-S0 = 10101 and jump to address 11 |
| 11 | Jump to address 11 if B=1, to address 0 if B=0 |
| 12 | Make S4-S0 = 10110 and jump to address 13 |
| 13 | Jump to address 13 if A=1, to address 0 if A=0 |

The push buttons A, B and C have the same function, and the functions of stopping progression, incrementing the up-down counter 207 by one unit or decrementing the up-down counter 207 by one unit, are performed in the same manner as in the preceding example. On the other hand, when the button A or the button B is actuated alone, incrementation or decrementation of the content of the register 203 is effected in the following manner. If the button A alone is actuated, the instructions at addresses 0, 1 and 5 are then performed, the effect of which is to increment the content of the register 203, and then the state of the output of the button A is again tested (instruction at address 6).

If it corresponds to an actuated state (A=1), the register 203 is again incremented (performance of the instruction at address 5), and so on until the button A ceases to be actuated or the content of the register 203 has reached the maximum value. The same system is used for decrementing the content of the register 203 when the button B alone is actuated. It will be appreciated that it is possible to adjust the time between two successive incrementations or decrementations of the content of the register 203, by introducing instructions referred to as delay instructions, the only effect of which is to introduce a given delay, into the loop formed by the instructions at addresses 5 and 6 and into the loop formed by the instructions at addresses 8 and 4.

The device, the mode of operation of which is now decribed with reference to the instructions set forth in Table 4, makes use of the speed at which a finger is moved over the sensors A, B, C and D, for the purposes of selecting the speed of progression. The operational unit and the control unit which are shown in FIGS. 2 and 4 are identical, except that, as the number of instructions is greater than in the previous examples, the capacity of the memory, the address field AD0 and AD1 of each instructions word, the multiplexer 105, the address register 111 and the decoder 112 must be consequentially adapted. In Table 4 n represents any of the integers 0 to 5.

TABLE 4

| Addresses | Instructions |
|---|---|
| 0 | Jump to address 0 if R=1, to address 1 if R=0 |
| 1 | Jump to address 6 if A=1, to address 2 if A=0 |
| 2 | Jump to address 29 if D=1, to address 3 if D=0 |
| 3 | Jump to address 5 if B=1, to address 4 if B=0 |
| 4 | Jump to address 5 if C=1, to address 0 if C=0 |
| 5 | Make S4-S0 = 10100 and jump to address 0 |
| 3n+6 | Jump to address 3n+7 if D=1, to address 3n+8 if D=0 |
| 3n+7 | Make S4-S0 = 10000 and jump to address 3(n+1)+7 |
| 3n+8 | Jump to address 27 if R=1, to address 3n+9 if R=0 |
| 24 | Jump to address 25 if D=1, to address 26 if D=0 |
| 25 | Make S4-S0 = 10000 and jump to address 28 |
| 26 | Jump to address 27 if R=1, to address 24 if R=0 |
| 27 | Make S4-S0 = 10110 and jump to address 28 |
| 28 | Jump to address 0 if R=1, to address 28 if R=0 |
| 3n+29 | Jump to address 3n+30 if A=1, to address 3n+31 if A=0 |
| 3n+30 | Make S4-S0 = 11000 and jump to address 3(n+1)+30 |
| 3n+31 | Jump to address 50 if R=1, to address 3n+32 if R=0 |
| 47 | Jump to address 48 if A=1, to address 49 if A=0 |
| 48 | Make S4-S0 = 11000 and jump to address 28 |
| 49 | Jump to address 50 if R=1, to address 47 if R=0 |
| 50 | Make S4-S0 = 10101 and jump to address 28 |

As long as none of the sensors A to D is actuated, the control unit performs the instruction at address 0, consisting of a test in respect of the variable R. If the sensors B and/or C alone are actuated, the fixed code CF is disposed in the register 203, corresponding to performance of the instructions at the addresses 0, 1, 2, 3 or (3 and 4) and 5. These same instructions are performed until the sensors B and/or C cease being actuated, that is to say, when the variable R goes to state 1. If the sensor A is actuated, the instructions at addresses 6 to 28 are then performed. If the sensor D is actuated, it is the instructions at addresses 29 to 50 and the instruction at address 28, which are then performed.

When the sensor A is actuated, the instructions at addresses 0 and 1 then having been performed, the instruction at address 6, corresponding to testing of the output variable of the sensor D, is then performed. If the above-mentioned variable is at state 1, that means that the finger has been moved over the sensors A to D very rapidly and the instruction at address 7 is then performed, whereby the content of the register 203 is incremented. This instruction is followed by the successive instructions at addresses 10, 13, 16, 19, 22 and 25 which each cause the content of the register 203 to be incremented. If the finger has been passed over the sensors A to D at a lower speed, the instructions at addresses 6 and 8, then 9 and 11, then 12 and 14, etc., will then be performed, until the variable D is at state 1, in which case the content of the register 203 will then be incremented. The earlier the moment at which the variable D is at state 1, the greater will be the number of incrementations of the content of the register 203. In the present example, the maximum number of incrementations of the content of the register 203 is fixed at seven, which, by passing the finger rapidly over the sensors, makes it possible to select the maximum-frequency signal F8 which is to be applied to the up-counting input EC of the up-down counter 207.

When the sensor D is actuated with the instructions at addresses 0, 1 and 2 then having been performed, it is the instructions at addresses 27 to 50 and then the instruction at address 38, which are then performed. This group of instructions is similar to the group of instructions at addresses 6 to 28, the differences being in respect of the variable tested (the test in respect of variable A replaces the test in respect of variable D), and the function performed (decrementation of the content of the register 203 replaces incrementation).

It should be noted that, if the speed at which the finger is passed over the sensors permits a speed of progression to be selected, the number of times that the finger is passed over the sensors is also involved in the selection operation. Thus, passing the finger twice successively in the same direction at average speed will have the same effect on the content of the register 203, as a single passage of the finger at high speed.

The input data device is decribed hereinbefore in regard to use in a watch, for correcting the time information displayed. The actual operation of introducing the displayed data can be effected by any known means, and in particular it is possible to provide an additional sensor, the effect of activation of which will be to validate the displayed data and actually provide for introduction thereof.

It is apparent moreover that the invention is in no way limited to the above-described use and that it can advantageously be used in many other systems requiring data introduction. The following uses will be mentioned by way of non-limiting example: seeking a station in a radio receiver and, generally, adjusting a measuring apparatus. Accordingly, the above detailed description is merely exemplary of the use and construction invention and it should be understood that many modifications can be made without departing from its spirit or scope. The invention is therefore not to be considered as limited by the foregoing description, but is only limited by the scope of the appended claims.

What is claimed is:

1. A data input device comprising a plurality of responsive sensors, a display device and control means for causing progression in a selected direction of a sequence of symbols on the display device in response to actuation of the sensors, said control means being arranged to control the progression of the symbols in a direction and at a speed which are variable in response to actuation of the sensors and also to provide for progression of the symbols in an acquired direction between two successive actuations of the sensors.

2. A data input device according to claim 1, wherein the control means maintains the acquired direction and speed of progression for the duration of the interval between two successive actuations of the sensors.

3. A data input device according to claim 1, wherein the control means is arranged to maintain the acquired direction of progression and to reduce the acquired speed of progression when no sensor has been actuated for a given period of time.

4. A data input device according to any of claims 1 to 3 and comprising at least three sensors which are responsive to the passage of the finger of an operator and which are grouped in first, second and third groups of at least one sensor each, and means for detecting the passage of the finger over the sensors of one or more groups and for detecting the order of actuation of the groups of sensors, said control means being responsive to the output of said detecting means such that when the three groups are successively actuated said control means causes the progression to occur at a speed and in a direction which depends on the number of times that the finger is passed over the sensors of the groups in one direction and the number of times that the finger is passed over the sensors of the groups in the other direction, said control means stopping the progression of the symbol when a sensor or sensors of the second group is actuated, and said control means single-stepping the progression in one direction and in the other direction respectively when a sensor or sensors of the first group and of the third group respectively is actuated.

5. A data input device according to any of claims 1 to 3 and comprising at least three sensors which are responsive to the passage of the finger of an operator and which are grouped in first, second and third groups of at least one sensor each, and means for detecting the passage of the finger over the sensors of one or more groups, and the order of actuation of the groups of sensors, and for detecting the speed of finger movement over the groups of sensors, said control means being responsive to the output of the detecting means such that when the three groups are successively actuated, said control means causes the progression to occur at a speed and in a direction which depend both on the number of times that the finger is passed over the sensors of the groups in one direction and the number of times that the finger is passed over the sensors of the groups in the other direction, and the speed at which the finger movements are performed, said control means stopping the progression of the symbols when a sensor or sensors of the second group is actuated, and said control means single-stepping said progression in one direction and in the other direction respectively when a sensor or sensors of the first group and of the third group respectively is actuated.

6. A data input device according to claim 4 wherein the sensors which are responsive to the passage of a finger are disposed in line.

7. A data input device according to claim 5 wherein the sensors which are responsive to the passage of a finger are disposed in line.

8. A data input device according to claim 4, wherein the sensors are of capacitive type.

9. A data input device according to claim 5, wherein the sensors are of capacitive type.

10. A data input device according to claim 6, wherein the sensors are of capacitive type.

11. A data input device according to claim 4, wherein the sensors are of resistive type.

12. A data input device according to claim 5, wherein the sensors are of resistive type.

13. A data input device according to claim 6, wherein the sensors are of resistive type.

14. A data input device according to any of claims 1 to 3 and comprising first, second and third sensors coupled to said control means, said control means being responsive to actuation of said sensors to provide progression of said symbols in a direction and at a speed dependent on the number of actuations of the first sensor and the number of actuations of said second sensor, to stop the progression in response to actuation of the third sensor, and to single-step the progression in one direction and in the other direction respectively when the third sensor is actuated simultaneously with actuation of the first sensor and the second sensor respectively.

15. A data input device according to any of claims 1 to 3 and comprising first, second and third sensors coupled to said control means, said control means being responsive to actuation of said sensors to provide for progression of the symbols in a direction and at a speed which depend both on the number of actuations of the first sensor and the number of actuations of the second sensor and the period of time for which the first and second sensors are acutated, to stop the progression in response to actuation of the third sensor, and to single-step the progression in one direction and in the other direction respectively when the third sensor is actuated simultaneously with actuation of the first sensor and the second sensor respectively.

16. A data input device according to claim 14, wherein the sensors are push buttons.

17. A data input device according to claim 15, wherein the sensors are push buttons.

* * * * *